US011210359B2

(12) United States Patent
Li et al.

(10) Patent No.: US 11,210,359 B2
(45) Date of Patent: Dec. 28, 2021

(54) DISTINGUISHING WEB CONTENT AND WEB CONTENT-ASSOCIATED DATA

(71) Applicant: International Business Machines Corporation, Armonk, NY (US)

(72) Inventors: Jenny S. Li, Cary, NC (US); Yu Deng, Yorktown Heights, NY (US); Al Chakra, Apex, NC (US); Theresa Tai, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 16/545,348

(22) Filed: Aug. 20, 2019

(65) Prior Publication Data

US 2021/0056158 A1 Feb. 25, 2021

(51) Int. Cl.
*G06F 17/00* (2019.01)
*G06F 16/957* (2019.01)
(Continued)

(52) U.S. Cl.
CPC ........ *G06F 16/9577* (2019.01); *G06F 16/953* (2019.01); *G06F 16/958* (2019.01);
(Continued)

(58) Field of Classification Search
CPC ...... G06F 40/30; G06F 16/958; G06F 16/953; G06F 40/279; G06F 16/9577; G06K 9/6215; G06K 9/00442; H04L 67/12
See application file for complete search history.

(56) References Cited

U.S. PATENT DOCUMENTS 9,015,037 B2 * 4/2015 Myslinski .............. G06Q 50/01
704/9
9,811,765 B2 * 11/2017 Wang ..................... G06F 16/51
(Continued)

OTHER PUBLICATIONS

Kumar et al., "Identifying Clickbait: A Multi-Strategy Approach Using Neural Networks," 41st International ACM SIGIR Conference on Research and Development in Information Retrieval (SIGIR-2018), Report No. IIIT/TR/2018/-1, Jul. 2018, 5 pages.
(Continued)

*Primary Examiner* — Laurie A Ries
(74) *Attorney, Agent, or Firm* — Jamar K. Ray

(57) ABSTRACT

A computer-implemented method can include obtaining content-associated data. The content-associated data can include an image that corresponds to content. The method can further include obtaining a set of descriptive terms corresponding to the image. The method can further include obtaining a set of related terms, based at least in part on the set of descriptive terms. The method can further include generating a set of user-expected terms, based at least in part on the set of related terms. The method can further include obtaining the content. The method can further include comparing the set of user-expected terms to the content. The method can further include generating a similarity value based on the comparing. The method can further include determining the similarity value does not exceed a threshold. The method can further include providing a notification in response to the determining that the similarity value does not exceed the threshold.

20 Claims, 5 Drawing Sheets

(51) Int. Cl.
*G06F 16/953* (2019.01)
*G06F 16/958* (2019.01)
*G06K 9/62* (2006.01)
*G06K 9/00* (2006.01)
*G06F 40/279* (2020.01)
*H04L 29/08* (2006.01)

(52) U.S. Cl.
CPC ....... *G06F 40/279* (2020.01); *G06K 9/00442* (2013.01); *G06K 9/6215* (2013.01); *H04L 67/12* (2013.01)

(56) References Cited

U.S. PATENT DOCUMENTS

| | | | | |
|---|---|---|---|---|
| 10,839,013 | B1* | 11/2020 | Werris | G06F 16/383 |
| 2002/0131641 | A1* | 9/2002 | Luo | G06K 9/52 382/218 |
| 2012/0278321 | A1* | 11/2012 | Traub | G06F 16/3331 707/736 |
| 2014/0201217 | A1* | 7/2014 | Hatami-Hanza | G06F 16/367 707/748 |
| 2015/0181262 | A1 | 6/2015 | Todd | |
| 2017/0039452 | A1* | 2/2017 | Osindero | G06K 9/78 |
| 2017/0200065 | A1* | 7/2017 | Wang | G06K 9/6274 |
| 2017/0364495 | A1* | 12/2017 | Srinivasan | G06K 9/00483 |
| 2018/0113676 | A1* | 4/2018 | De Sousa Webber | G06F 40/279 |
| 2018/0225278 | A1* | 8/2018 | Alba | G06F 40/30 |
| 2019/0043106 | A1* | 2/2019 | Talmor | G06N 3/006 |
| 2019/0339824 | A1* | 11/2019 | Hamedi | G06K 9/00718 |
| 2020/0081964 | A1* | 3/2020 | Maneriker | G06F 40/109 |
| 2020/0134074 | A1* | 4/2020 | Mankovskii | G06F 16/26 |

OTHER PUBLICATIONS

Rony et al., "BaitBuster: Destined to Save You Some Clicks," Computation+Journalism, Oct. 2017, Illinois, USA, 5 pages.

Rony et al., "Diving Deep into Clickbaits: Who Use Them to What Extents in Which Topics with What Effects?," arXiv:1703.09400v1, Mar. 28, 2017, 8 pages.

Zannettou et al., "The Good, the Bad and the Bait: Detecting and Characterizing Clickbait on YouTube," Department of Electiical Engineering, Computer Engineering and Informatics, Mar. 2018, DOI: 10.1109/SPW.2018.00018, 8 pages.

Newman et al., "The art of detecting data and image manipulation," Elsevier, Nov. 4, 2013, 9 pages.

Unknown, "These misleading thumbnails are getting out of hand . . .," Reddit, r/youtube, Printed Jun. 4, 2019, 3 pages.

Mell et al., "The NIST Definition of Cloud Computing", Recommendations of the National Institute of Standards and Technology, Sep. 2011, 7 pages.

* cited by examiner

DISTINGUISHING WEB CONTENT AND WEB CONTENT-ASSOCIATED DATA

BACKGROUND

The present disclosure relates to web content, and more specifically, to addressing differences between web content and content-associated data.

Web content, such as web-based articles or advertisements, can include web content-associated data, such as corresponding images and captions. The content-associated data can be displayed to a user before the web content is displayed to the user. The content-associated data can convey information about the web content to the user.

SUMMARY

According to embodiments of the present disclosure, a computer-implemented method can include obtaining, by a content analysis system, content-associated data. The content-associated data can include an image. The image can correspond to content. The method can further include obtaining, by the content analysis system, a set of descriptive terms. The set of descriptive terms can correspond to the image. The method can further include obtaining, by the content analysis system, a set of related terms. The set of related terms can be based at least in part on the set of descriptive terms. The method can further include generating, by the content analysis system, a set of user-expected terms. The set of user-expected terms can be based at least in part on the set of related terms. The method can further include obtaining, by the content analysis system, the content. The method can further include comparing, by the content analysis system, the set of user-expected terms to the content. The method can further include generating, by the content analysis system, a similarity value based on the comparing. The method can further include determining, by the content analysis system, the similarity value does not exceed a threshold. The method can further include providing, by the content analysis system, a notification in response to the determining that the similarity value does not exceed the threshold.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
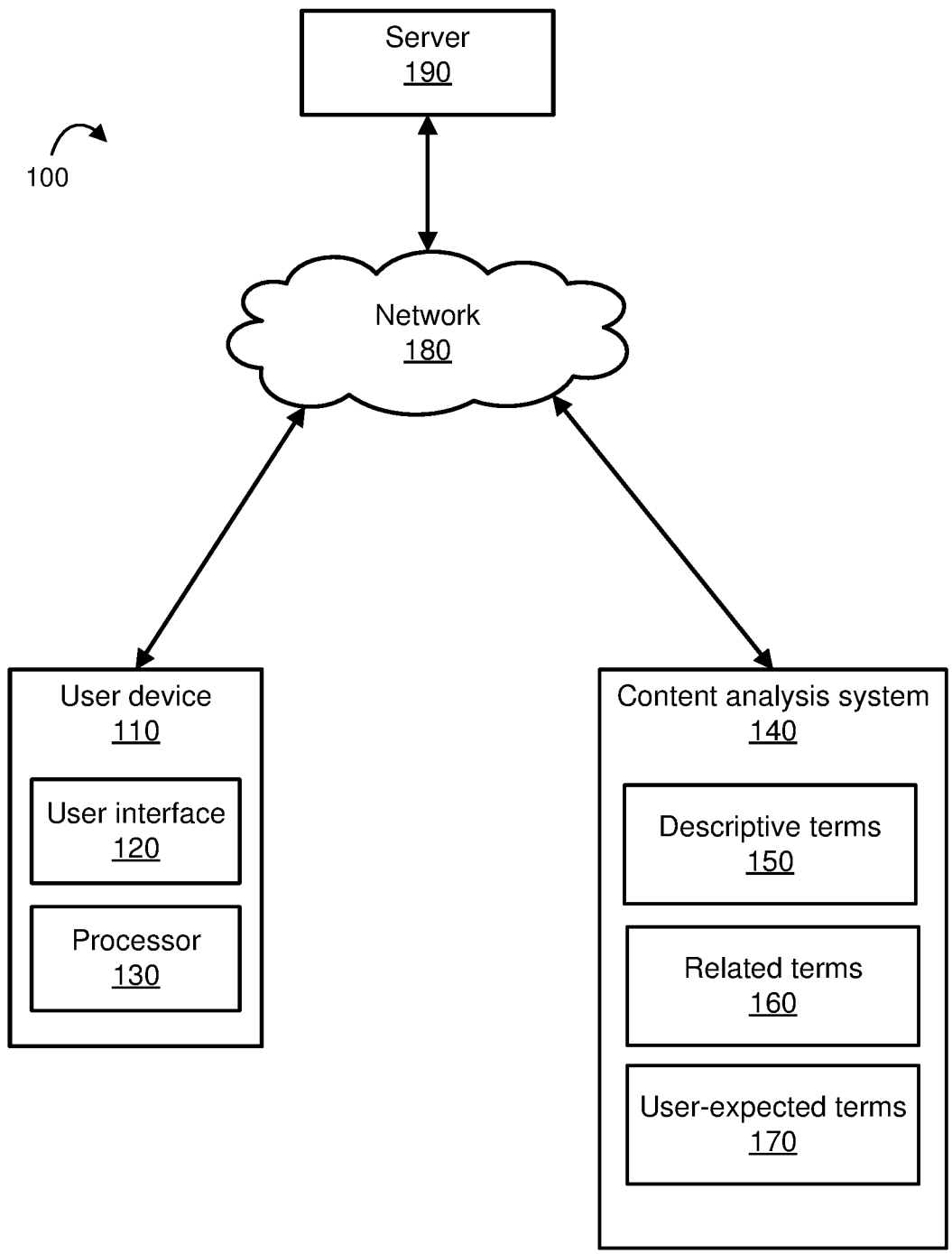
FIG. 1 depicts an example computing environment that includes a user device and a content analysis system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to detecting differences between content and content-associated data, more particular aspects relate to notifying a user when content-associated data may be misleading. While the present disclosure is not necessarily limited to such applications, various aspects of the disclosure may be appreciated through a discussion of various examples using this context.

A website can display content-associated data, such as images and captions, to summarize and/or attract a user's attention to content, such as articles and advertisements. In some instances, such content-associated data can be designed or drafted primarily to attract a user's attention and increase traffic on a website. In these instances, an image or caption that appears to represent the substance of the content can be loosely related or unrelated to the content; thus, the user can be misled into accessing the content. For example, a website can display content-associated data such as an image that includes palm trees, people walking along a beach, and a commercial airplane, along with the caption, "Start Traveling Today!" In this example, a user could expect a link corresponding to the image and caption to direct the user to content pertaining to tropical travel destinations and/or travel deals. In contrast, the user could activate the link and discover an advertisement suggesting lucrative investment strategies that could be obtained at an investment seminar. While such misleading content-associated data can benefit a website, it can frustrate and waste the time of a user.

To address these and other problems, embodiments of the present disclosure include a method and system for detecting differences between content and content-associated data. In some embodiments, content can include text compositions that are accessible via the Internet, such as web-based articles and web-based advertisements. In some embodiments, content-associated data can include information that corresponds to the content, such as a set of images, a caption, and/or metadata. In some embodiments, a website or web browser can display the content-associated data to a user before the website or web browser displays the content to the user. In some embodiments, a content analysis system can obtain content-associated data, generate user-expected terms that are based at least in part on the content-associated data, and generate a similarity value between the content-associated data and the content. In some embodiments, the content analysis system can generate the similarity value before a user accesses the content. In some embodiments, the content analysis system can warn a user when a similarity value does not exceed a threshold. In some embodiments, the content analysis system can obtain feedback from a user regarding a similarity between the content-associated data and the content.

In some embodiments, the content analysis system can improve the usability of a website or a web browser by improving the efficiency with which a user can locate and display information that the user desires to access. In some embodiments, the content analysis system can provide improved accuracy of detecting misleading content-associated data by analyzing at least two forms of content-associated data (e.g., image data as well as caption data).

Turning to the figures, FIG. 1 illustrates an example computing environment 100 in accordance with embodiments of the present disclosure. Computing environment 100 includes a user device 110, a server 190, a content analysis system 140, and a network 180. User device 110 may be an electronic device such as a mobile telephone, tablet, or computing device. In some embodiments, at least one of the user device 110, server 190, and the content analysis system 140 can include a computer system, such as the computer system 301 shown in FIG. 3.

Referring back to FIG. 1, the user device 110 can include a user interface 120 and a processor 130. In some embodiments, the user interface 120 can include at least one of a display, alphanumeric keypad, microphone, speaker, and camera. In some embodiments, the user interface 120 can include a screen or a touch screen that is configured to display a web browser and/or a webpage to a user. In some embodiments, the user interface 120 can allow a user to make selections and activate links to display content provided by one or more websites. In some embodiments, the processor 130 can include programming instructions to perform one or more method steps that are identical or substantially similar to those described in FIG. 2 below.

In some embodiments, the user device 110 can communicate with the server 190 and/or the content analysis system 140 via one or more networks 180. In some embodiments, the content analysis system 140 can include a discrete computer system, such as the computer system 301 shown in FIG. 3. In some embodiments, the content analysis system 140 can be a computer program or application, such as a browser plug-in application, implemented on a processor, such as processor 130. In some embodiments, content analysis system 140 can obtain and/or generate descriptive terms 150, related terms 160, and/or user-expected terms 170, as discussed in more detail below. In some embodiments, the server 190 can store and transmit content and content-associated data.

In some embodiments, the network 180 can be a wide area network (WAN), a local area network (LAN), an internet, or an intranet. In some embodiments, the network 180 can be implemented within a cloud computing environment or using one or more cloud computing services. In some embodiments, the network 180 can be substantially similar to, or the same as, cloud computing environment 50 described in FIG. 4 and FIG. 5. Consistent with various embodiments, a cloud computing environment can include a network-based, distributed data processing system that provides one or more cloud computing services. Further, a cloud computing environment can include multiple computers disposed within one or more data centers and configured to share resources over the network 180.

Figure 2:
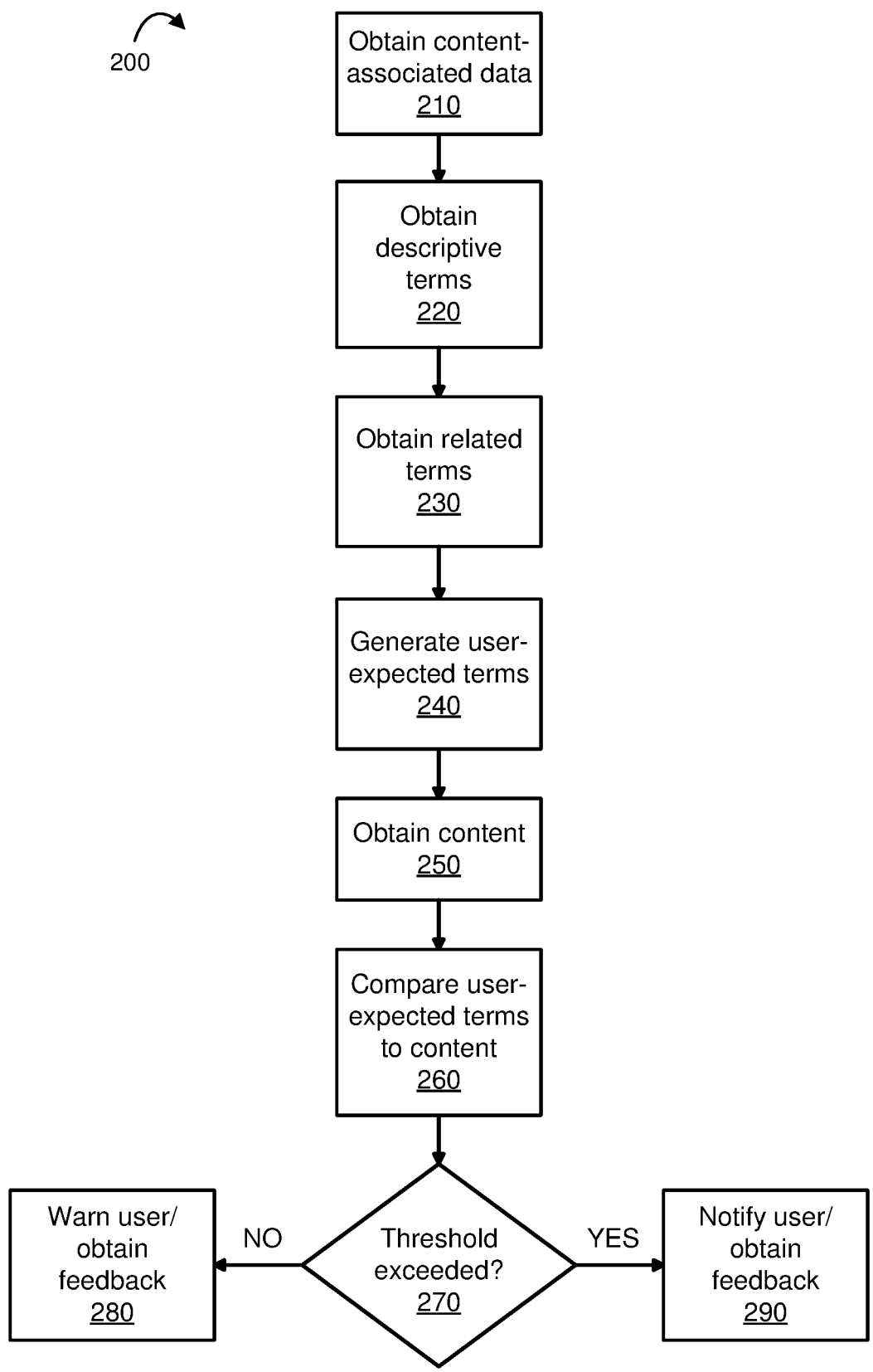
FIG. 2 depicts a flowchart of an example method for determining a degree of similarity between content-associated data and corresponding content, in accordance with embodiments of the present disclosure.

FIG. 2 illustrates a flowchart of an example method 200 for determining a degree of similarity between content-associated data and corresponding content, in accordance with embodiments of the present disclosure. The method 200 can be performed by a content analysis system, such as the content analysis system 140 described with respect to FIG. 1. Referring back to FIG. 2, in step 210, the content analysis system can obtain content-associated data. In some embodiments, content-associated data can include one or more images, a set of caption terms (e.g., one or more words in the caption), and/or metadata, that corresponds to content. In some embodiments, the content analysis system can include a set of programming instructions to obtain content-associated data by copying the content-associated data to a storage location automatically or in response to an action of a user. For example, in some embodiments, on a user device, a user can view a webpage that includes a set of thumbnail images and captions that correspond to content (e.g., text compositions, such as articles and advertisements). In this example, the content analysis system can be a browser plug-in application that is installed on the user device. Further in this example, the content analysis system can be configured such that it automatically copies both the content-associated data and the corresponding content to a storage location when the browser of the user device receives the webpage. In some embodiments, the content analysis system can be configured such that it copies the content-associated data and/or the corresponding content to a storage location in response to a user action, such as the user placing a pointer over one of the thumbnail images or captions, or the user commanding the content analysis system to obtain content-associated data from the webpage.

In step 220, the content analysis system can obtain a set of descriptive terms that correspond to the content-associated data. In some embodiments, the set of descriptive terms can include terms that convey image details, such as what the image includes, who the image includes, and a geographic location where the image may have been captured. The content analysis system can utilize image analysis technology (e.g., object recognition and facial recognition technology) to obtain the set of descriptive terms. In some embodiments, such image analysis technology can be included in the content analysis system, and in some embodiments, the content analysis system can communicate with an external source, such as a remote computing device configured to perform image analyses, to obtain a set of descriptive terms.

For example, in step 210, the content analysis system can obtain content-associated data that includes an image of a pet dog swimming across a large pool of water in a street that is surrounded by suburban homes. In this example, based on the image, in step 220, the content analysis system can obtain descriptive terms, such as: "dog," "dog swimming," "water in street," "pet alone," "residential area."

In step 230, the content analysis system can obtain a set of related terms. In some embodiments, related terms can include terms that can be inferred or derived from one or more descriptive terms of the set of descriptive terms obtained in step 220. Accordingly, in some embodiments, the related terms can be based at least in part on the descriptive terms. In some embodiments, the content analysis system can obtain related terms from an artificial intelligence tool, such as an inference engine. In some embodiments, the content analysis system can obtain related terms from a storage location that includes sets of previously grouped terms that were determined to be related (e.g., sets of related terms that the content analysis system previously obtained and stored). In some embodiments, in step 230, the content analysis system can utilize a search tool, such as a web crawler, to obtain related terms.

For example, in some embodiments, the content analysis system can search a set of news articles to find terms that appear with one or more of the descriptive terms at a frequency that exceeds a threshold number. For example, in some embodiments, such a search using the descriptive terms "water in street" and "residential area" can indicate that those descriptive terms are frequently used in news articles with found terms such as "flooding," "heavy rain," "hurricane," and "storm." In another example, in some embodiments, such a search using the descriptive terms "dog swimming" and "pet alone" can indicate that those descriptive terms are frequently used in news articles with found terms such as "abandoned pets," "endangered pets," and "animal rescue." In these examples, the frequency with which the descriptive terms may be included with the found terms in the set of news articles may exceed a threshold number; thus, the content analysis system can designate the found terms as related terms. In some embodiments, the content analysis system can utilize machine learning methods, paraphrasing technology, and/or semantic similarity technology to obtain the set of related terms.

In step 240, the content analysis system can generate a set of user-expected terms. In some embodiments, the set of user-expected terms can include terms that a user could expect to find in the content in light of the content-associated data. In some embodiments, the content analysis system can generate the set of user-expected terms based, at least in part, on a set of caption terms from a caption corresponding to content. In some embodiments, the content analysis system can generate the set of user-expected terms by weighting a set of related terms and selecting higher-weighted related terms as user-expected terms.

For example, continuing with the example discussed above, in some embodiments, the image of the pet dog swimming can include the caption, "Southwestern Rains Continue." Additionally, in this example, an image analysis may indicate that the size of the portion of the image that includes the pet dog is relatively small in comparison to the size of the portion of the image that includes the pool of water and the suburban homes. Accordingly, in this example, the content analysis system can assign a higher weight to related terms that are relevant to the caption terms "rains continue" (e.g., "flooding," "heavy rain," "storm," etc.) and a lower weight to related terms that are relevant to pets and animal rescue (e.g., "abandoned pets," "endangered pets," etc.). In this example, the content analysis system can assign such weights based on a determination that the relatively small size of the image that is devoted to the pet dog indicates a lower significance of the pet dog. Accordingly, the content analysis system can determine that the content is less likely to include terms relevant to pets and animal rescue. Furthermore in this example, the content analysis system can determine that the relatively large size of the image that is devoted to the suburban homes and the pool of water in the street indicates a higher significance of those objects. In some embodiments, the content analysis system can determine that the higher significance of those objects, coupled with the caption terms "rains continue" indicates that the content is likely to include terms relevant to ongoing rain in a residential area. Therefore, in some embodiments, the content analysis system can select higher-weighted terms (e.g., "flooding," "heavy rain," "storm," etc.) as user-expected terms. In some embodiments, in step 240, the content analysis system can utilize word vector techniques to generate a set of user-expected terms.

In step 250, the content analysis system can obtain content. In some embodiments, content can include text compositions such as web-based articles and web-based advertisements. As discussed with regard to step 210 above, the content analysis system can obtain content automatically or in response to a user action.

In step 260, the content analysis system can compare the user-expected terms to the content. In some embodiments, step 260 can include the content analysis system obtaining a summary of one or more portions of the content and comparing the user-expected terms to the summary. In some embodiments, the summary can describe a meaning conveyed in the content and have fewer terms than the content has. In some embodiments, the summary can include a compilation of frequently appearing terms or phrases from the content. The content analysis system can obtain such a summary by utilizing technology such as word vector technology and machine learning techniques.

In some embodiments, comparing the user-expected terms to the content and/or to the summary can include the content analysis system searching for each of the user-expected terms in the content and/or in the summary. In some embodiments, step 260 can include the content analysis system counting a number of instances of user-expected terms that the content analysis system finds in the content and/or in the summary. For example, continuing with the example regarding the suburban homes and the large pool of water discussed above, the content analysis system can obtain the following count of user-expected terms in the content: "flooding"—10 instances; "hurricane"—0 instances; "heavy rain"—6 instances; "storm"—7 instances. In some embodiments, step 260 can include the content analysis system generating a similarity value corresponding to the count of user-expected terms in the content. For example, in some embodiments, the content analysis system can generate a similarity value of 75%, based on 3 of 4 user-expected terms having 5 or more instances in the content. In some embodiments, instructions for generating a similarity value (e.g., counting the number of user-expected terms having 5 or more instances in the content) can be determined by a user. In some embodiments, such instructions can be determined by machine learning techniques implemented by the content analysis system.

In step 270, the content analysis system can compare the similarity value to a predetermined threshold and determine whether the similarity value exceeds the predetermined threshold. Continuing with the example above, in some embodiments, the content analysis system can compare the 75% similarity value to a threshold of 60% and determine that the similarity value exceeds the threshold. In some embodiments, the predetermined threshold can be user-defined. In some embodiments, the predetermined threshold can be defined according to machine learning techniques implemented by the content analysis system.

In step 280, if the content analysis system determines that the similarity value does not exceed the predetermined threshold, then the content analysis system can, in response, provide a notification, such as a warning, to the user. In some embodiments, such a warning can indicate that the content may be misleading. For example, in some embodiments, such a notification can include a colored indicator, such as a red or orange dot, displayed beside a link to the content. In some embodiments, the content analysis system can provide such a notification in the form of an alphanumeric message on a user interface of a user device. In some embodiments, the content analysis system can provide such a notification in the form of an audible alert. In some embodiments, the content analysis system can provide the notification to a user before the user accesses the content (e.g., before a user activates a link to view the content). In some embodiments, step 280 can include the content analysis system receiving feedback from the user regarding the similarity between the content-associated data and the content. In some embodiments, step 280 can include the content analysis system receiving feedback from the user regarding the notification, such as whether a warning was accurate or helpful.

In step 290, if the content analysis system determines that the similarity value does exceed the predetermined threshold, then the content analysis system can, in response, provide a corresponding notification to the user, such as a notification that no misleading content was identified. For example, in some embodiments, such a notification can include a colored indicator, such as a green dot, displayed beside a link to the content. In some embodiments, the content analysis system can provide such a notification in the form of an alphanumeric message or an audible alert. In some embodiments, the content analysis system can provide the notification to a user before the user accesses the content (e.g., before a user activates a link to view the content). In some embodiments, step 290 can include the content analysis system receiving feedback from the user regarding the similarity between the content-associated data and the content. In some embodiments, step 280 can include the content analysis system receiving feedback from the user regarding the notification, such as whether the notification was accurate or helpful.

Figure 3:
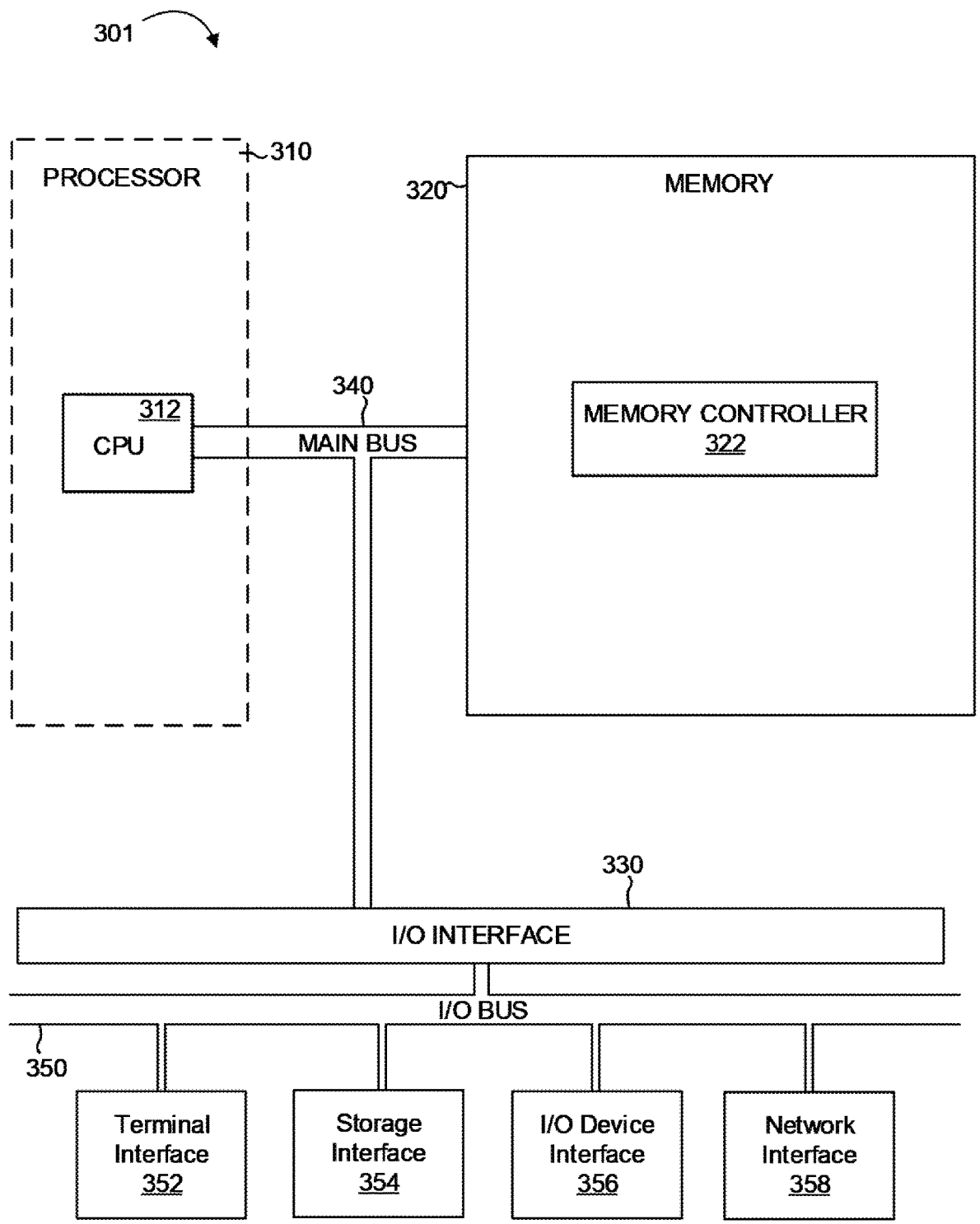
FIG. 3 depicts the representative major components of a computer system that may be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
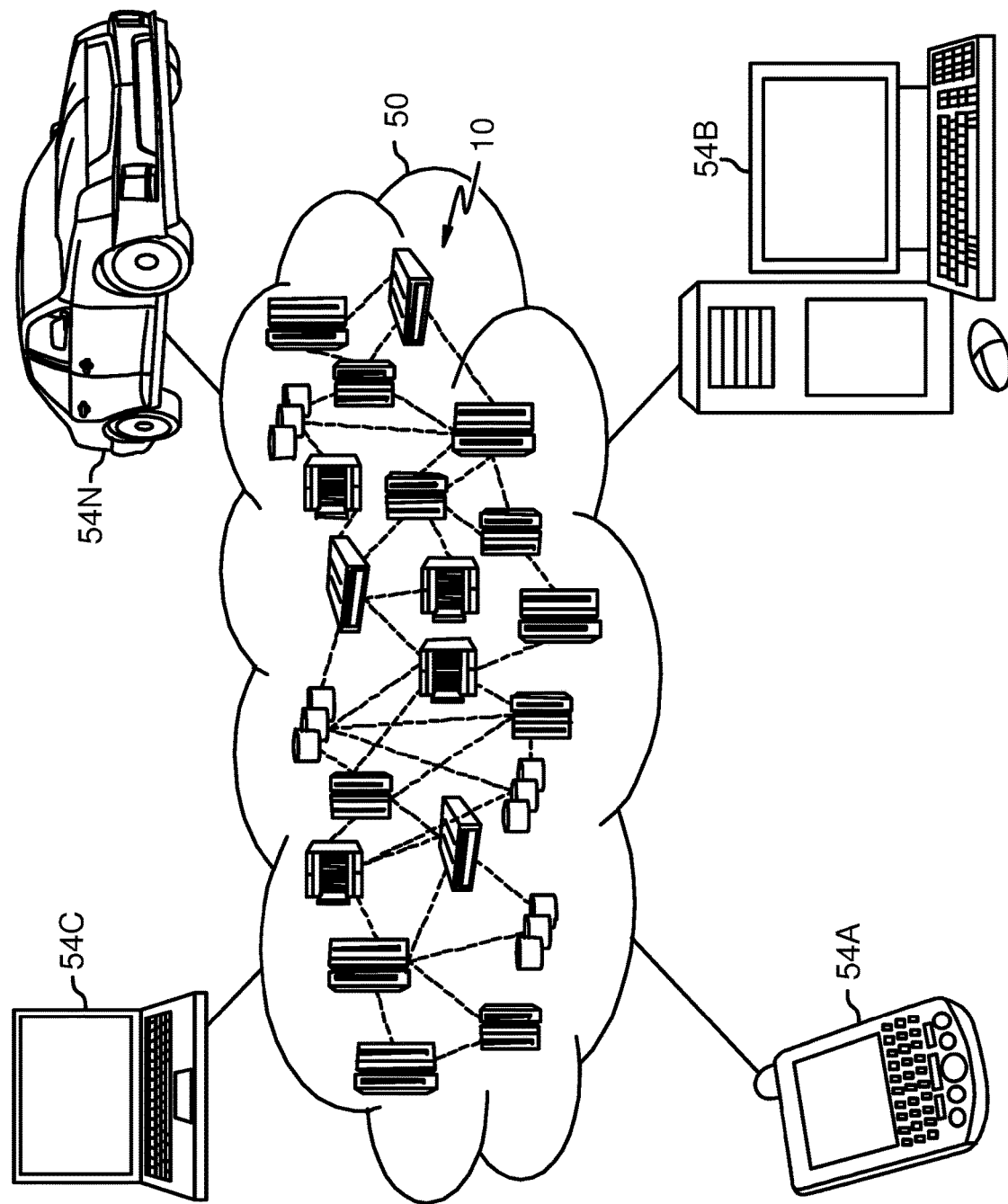
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
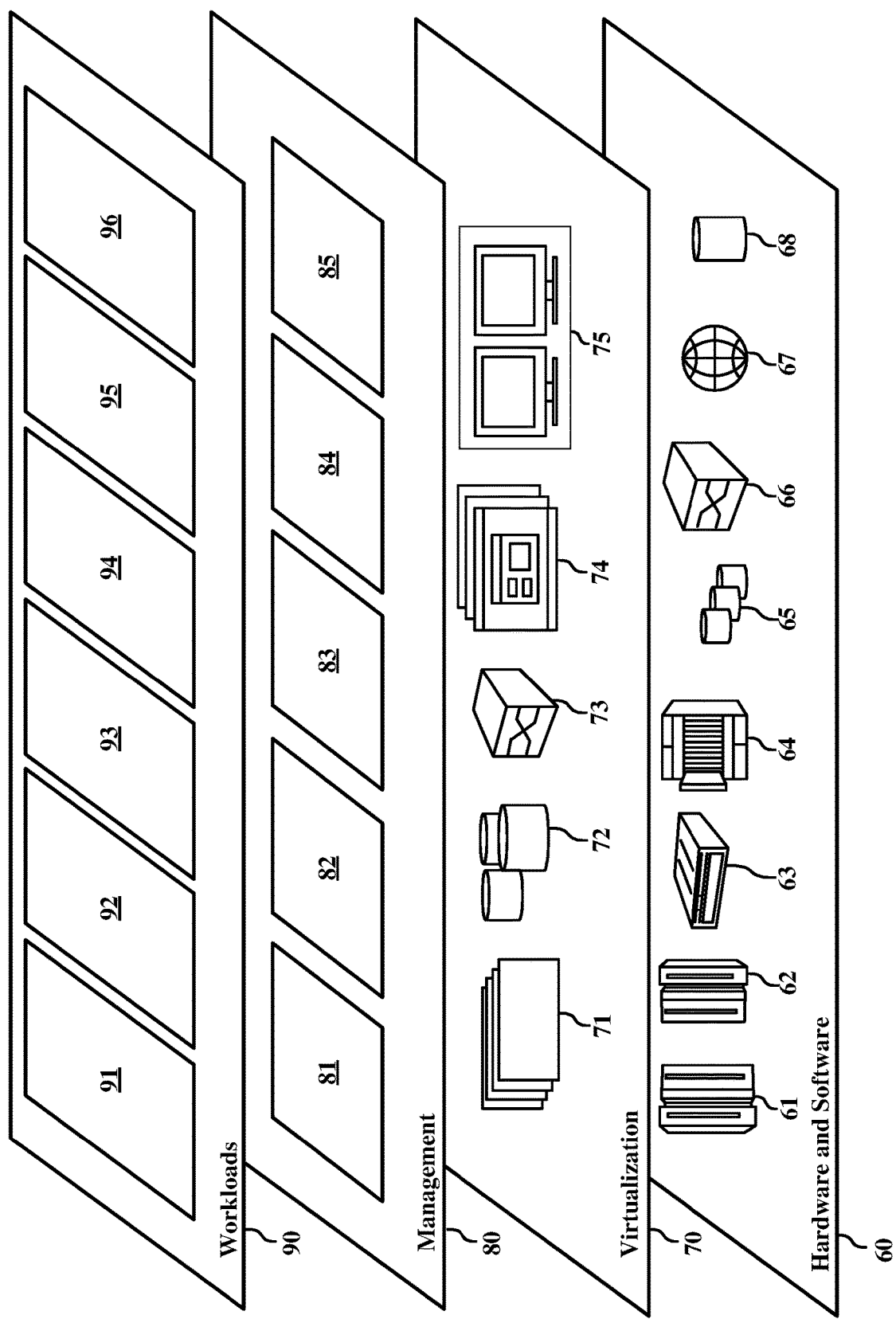
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and content analysis logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining, by a content analysis system, content-associated data comprising an image that corresponds to content, the image displayed to a user before the content is displayed to the user;
   obtaining, by the content analysis system, a set of descriptive terms that describe the image;
   obtaining, by the content analysis system, a set of related terms, based at least in part on the set of descriptive terms;
   generating, by the content analysis system, a set of user-expected terms, based at least in part on the set of related terms;
   obtaining, by the content analysis system, the content;
   comparing, by the content analysis system, the set of user-expected terms to the content;
   generating, by the content analysis system, a similarity value based on the comparing;
   determining, by the content analysis system, that the similarity value does not exceed a threshold; and
   providing, by the content analysis system, a notification in response to the determining that the similarity value does not exceed the threshold.

2. The computer-implemented method of claim 1, wherein the content is a text composition on a website and the image corresponds to the text composition.

3. The computer-implemented method of claim 1, wherein the content-associated data further comprises a caption that corresponds to the content, and wherein the caption is displayed to the user before the content is displayed to the user.

4. The computer-implemented method of claim 3, further comprising:
   obtaining, by the content analysis system, a set of caption terms from the caption; and
   wherein generating the set of user-expected terms is based at least in part on the set of caption terms.

5. The computer-implemented method of claim 4, wherein generating the set of user-expected terms further comprises weighting one or more related terms of the set of related terms.

6. The computer-implemented method of claim 5, wherein the weighting is based on an image analysis of the image.

7. The computer-implemented method of claim 1, wherein comparing the set of user-expected terms to the content comprises:
   obtaining, by the content analysis system, a summary corresponding to the content; and
   comparing, by the content analysis system, the set of user-expected terms to the summary.

8. A content analysis system comprising:
   a processor; and
   a memory in communication with the processor, the memory containing program instructions that, when executed by the processor, are configured to cause the processor to perform a method, the method comprising:
   obtaining, by the content analysis system, content-associated data comprising an image that corresponds to content, the image displayed to a user before the content is displayed to the user;
   obtaining, by the content analysis system, a set of descriptive terms that describe the image;
   obtaining, by the content analysis system, a set of related terms, based at least in part on the set of descriptive terms;
   generating, by the content analysis system, a set of user-expected terms, based at least in part on the set of related terms;
   obtaining, by the content analysis system, the content;
   comparing, by the content analysis system, the set of user-expected terms to the content;
   generating, by the content analysis system and before the user accesses the content, a similarity value based on the comparing;
   determining, by the content analysis system, that the similarity value does not exceed a threshold; and
   providing, by the content analysis system and before the user accesses the content, a notification in response to the determining that the similarity value does not exceed the threshold.

9. The content analysis system of claim 8, wherein the content is a text composition on a website and the image corresponds to the text composition.

10. The content analysis system of claim 8, wherein the content-associated data further comprises a caption that corresponds to the content, and wherein the caption is displayed to the user before the content is displayed to the user.

11. The content analysis system of claim 10, further comprising:
   obtaining, by the content analysis system, a set of caption terms from the caption; and
   wherein generating the set of user-expected terms is based at least in part on the set of caption terms.

12. The content analysis system of claim 11, wherein generating the set of user-expected terms further comprises weighting one or more related terms of the set of related terms.

13. The content analysis system of claim 12, wherein the weighting is based on an image analysis of the image.

14. The content analysis system of claim 8, wherein comparing the set of user-expected terms to the content comprises:
   obtaining, by the content analysis system, a summary corresponding to the content; and
   comparing, by the content analysis system, the set of user-expected terms to the summary.

15. A computer program product, the computer program product comprising a computer readable storage medium having program instructions embodied therewith, the program instructions executable by a computer to cause the computer to:
   obtain, by a content analysis system, content-associated data comprising an image that corresponds to content, the image displayed to a user before the content is displayed to the user;
   obtain, by the content analysis system, a set of descriptive terms that describe the image;
   obtain, by the content analysis system, a set of related terms, based at least in part on the set of descriptive terms;
   generate, by the content analysis system, a set of user-expected terms, based at least in part on the set of related terms;
   obtain, by the content analysis system, the content;
   compare, by the content analysis system, the set of user-expected terms to the content;
   generate, by the content analysis system and before the user accesses the content, a similarity value based on the comparing;
   determine, by the content analysis system, that the similarity value does not exceed a threshold; and
   provide, by the content analysis system and before the user accesses the content, a notification in response to the determining that the similarity value does not exceed the threshold.

16. The computer program product of claim 15, wherein the content is a text composition on a website and the image corresponds to the text composition.

17. The computer program product of claim 15, wherein the content-associated data further comprises a caption that corresponds to the content, and wherein the caption is displayed to the user before the content is displayed to the user.

18. The computer program product of claim 17, wherein the program instructions, when executed by the computer, are configured to further cause the computer to:
   obtain, by the content analysis system, a set of caption terms from the caption; and
   wherein generating the set of user-expected terms is based at least in part on the set of caption terms.

19. The computer program product of claim 18, wherein the instructions to generate the set of user-expected terms further comprises instructions to weight one or more related terms of the set of related terms.

20. The computer program product of claim 19, wherein the instructions to weight include instructions to assign one or more weights to the one or more related terms based on an image analysis of the image.

* * * * *